US009337530B1

(12) United States Patent
Baden et al.

(10) Patent No.: US 9,337,530 B1
(45) Date of Patent: May 10, 2016

(54) COVER FOR CONVERTING ELECTROMAGNETIC RADIATION IN ELECTRONIC DEVICES

(75) Inventors: Shaun M. Baden, Studio City, CA (US); Wesley L. Negus, Santa Monica, CA (US); Sunny Trinh, Calabasas, CA (US)

(73) Assignee: Protek Innovations LLC, Studio City, CA (US)

( * ) Notice: Subject to any disclaimer, the term of this patent is extended or adjusted under 35 U.S.C. 154(b) by 654 days.

(21) Appl. No.: 13/480,418

(22) Filed: May 24, 2012

Related U.S. Application Data

(60) Provisional application No. 61/489,641, filed on May 24, 2011.

(51) Int. Cl.
*H01Q 1/24* (2006.01)
*H01Q 1/27* (2006.01)

(52) U.S. Cl.
CPC .............. *H01Q 1/245* (2013.01); *H01Q 1/273* (2013.01)

(58) Field of Classification Search
CPC .............................. H01Q 1/245; H01Q 1/273
USPC .......................................................... 343/894
See application file for complete search history.

(56) References Cited

U.S. PATENT DOCUMENTS

| | | | |
|---|---|---|---|
| 5,781,160 A | 7/1998 | Walton | |
| 6,097,345 A | 8/2000 | Walton | |
| 6,249,256 B1 | 6/2001 | Luxon et al. | |
| 6,320,558 B1 | 11/2001 | Walton | |
| 6,341,217 B1 | 1/2002 | Wong | |
| 6,452,553 B1 | 9/2002 | Cohen | |
| 6,483,468 B2 | 11/2002 | Walton | |
| 6,492,957 B2 * | 12/2002 | Carillo et al. | ................. 343/841 |
| 6,606,076 B2 | 8/2003 | Burnside et al. | |
| 6,615,026 B1 | 9/2003 | Wong | |
| 7,015,868 B2 | 3/2006 | Baliarde et al. | |
| 7,123,208 B2 | 10/2006 | Baliarda et al. | |
| 7,173,343 B2 | 2/2007 | Kugel | |
| 7,239,291 B2 | 7/2007 | Walton | |
| 7,256,751 B2 | 8/2007 | Cohen | |
| 7,394,432 B2 | 7/2008 | Baliarda et al. | |
| 7,485,885 B2 | 2/2009 | Dandurand | |
| 7,528,726 B2 | 5/2009 | Lee et al. | |
| 7,554,491 B2 | 6/2009 | Burkholder et al. | |
| 7,561,109 B2 | 7/2009 | Walton et al. | |
| 7,576,696 B2 | 8/2009 | Walton et al. | |

(Continued)

OTHER PUBLICATIONS

Avago Technologies, "HSMS-286x Series—Surface Mount Microwave Schottky Detector Diodes Datasheet", Aug. 26, 2009, pp. 1-18.

*Primary Examiner* — Hoang V Nguyen
*Assistant Examiner* — Michael Bouizza
(74) *Attorney, Agent, or Firm* — Marcus T. Hunt

(57) ABSTRACT

Methods and apparatuses for capturing at least a portion of the radio frequency ("RF") radiation emitted from an electronic device or other external sources and converting it into electric current that can be used for a number of different functional purposes including to drive a circuit that provides an indication when the RF radiation is captured and its relative intensity. One of the advantages of these techniques is that users can be protected from the potential harmful effects of long-term exposure to the RF radiation emitted from electronic devices, particularly for wireless phones which are often held in close proximity to a user's body. The indication can provide users with an indication that the circuit is redirecting the RF radiation away from their bodies and dissipating it as electrical energy.

29 Claims, 9 Drawing Sheets

(56) References Cited

U.S. PATENT DOCUMENTS

| | | |
|---|---|---|
| 7,612,138 B2 | 11/2009 | Kuznetsov et al. |
| 7,750,855 B2 | 7/2010 | Wong |
| 7,800,554 B2 | 9/2010 | Tucek et al. |
| 7,898,493 B1 | 3/2011 | Rojas et al. |
| 8,330,298 B2 | 12/2012 | Scherbenski et al. |
| 8,525,750 B2 | 9/2013 | Tucek et al. |
| 8,704,729 B2 | 4/2014 | Tucek et al. |
| 8,750,948 B2 | 6/2014 | Wong et al. |
| 8,957,813 B2 | 2/2015 | McCaughey et al. |
| 2001/0026246 A1 | 10/2001 | Burnside et al. |
| 2003/0016519 A1 | 1/2003 | Bachman |
| 2004/0160309 A1* | 8/2004 | Stilp .................... 340/10.2 |
| 2005/0079820 A1 | 4/2005 | Yamashita |
| 2006/0019696 A1 | 1/2006 | Brunel et al. |
| 2006/0022889 A1 | 2/2006 | Chiang et al. |
| 2006/0232479 A1 | 10/2006 | Walton |
| 2006/0232483 A1 | 10/2006 | Iwai et al. |
| 2007/0004456 A1 | 1/2007 | Shimada |
| 2007/0132657 A1 | 6/2007 | Walton et al. |
| 2007/0257845 A1 | 11/2007 | Wong |
| 2007/0273528 A1 | 11/2007 | Burkholder et al. |
| 2007/0273529 A1 | 11/2007 | Lee et al. |
| 2008/0198074 A1 | 8/2008 | Walton et al. |
| 2009/0178842 A1 | 7/2009 | Liu |
| 2009/0315634 A1 | 12/2009 | Sertel et al. |
| 2009/0322622 A1 | 12/2009 | Tucek et al. |
| 2010/0060457 A1 | 3/2010 | Burnside et al. |
| 2010/0113111 A1 | 5/2010 | Wong et al. |
| 2010/0141153 A1 | 6/2010 | Recker et al. |
| 2010/0214180 A1 | 8/2010 | Krogerus |
| 2010/0234081 A1 | 9/2010 | Wong et al. |
| 2010/0315295 A1 | 12/2010 | Tucek et al. |
| 2011/0036912 A1 | 2/2011 | Guo et al. |
| 2011/0050524 A1 | 3/2011 | Walton et al. |

* cited by examiner

RF Radiation Sources 100

COVER FOR CONVERTING ELECTROMAGNETIC RADIATION IN ELECTRONIC DEVICES

CROSS-REFERENCE TO RELATED APPLICATIONS

This application claims priority to U.S. Provisional Application No. 61/489,641 filed May 24, 2011, which is incorporated herein by reference in its entirety.

FIELD OF THE INVENTION

At least certain embodiments of the invention relate generally to RF radiation, and particularly to converting RF radiation in electronic devices.

BACKGROUND

Electromagnetic radiation can include any form of electromagnetic waves at any frequency, including radio waves, microwaves, infrared, visible light, ultra-violet radiation, X-Rays and Gamma Rays. Of particular interest is electromagnetic radiation in the radio frequency ("RF") range. RF radiation originates from a variety of electronic devices encountered in everyday life such as wireless phones, music players, microwave ovens, computers, PDAs, and so on. Consequently, exposure by a typical person to RF radiation continues to increase with the prevalence of these devices. Nowadays, the use of wireless phones and other RF radiation generating devices has become so pervasive that many users forego traditional hardline telephones in their homes for the convenience of wireless connectivity and mobility.

The continued and ever-increasing exposure by the population to RF radiation may have detrimental effects to users over time. It is already known that EM radiation in the very high frequency form of ultraviolet or X-rays can cause damage to Deoxyribonucleic Acid ("DNA") in humans. It has lately been proposed that lower frequency RF radiation may also have an effect on DNA. As our understanding of RF radiation and its possible detrimental effects continues to develop, it is quite possible that a variety of yet unknown effects from exposure to RF radiation may also be uncovered in the future. This damage may likely be exacerbated by continued exposure at close proximity. For example, use of a wireless telephone or Bluetooth device held in proximity to a user's ear may increase RF radiation exposure and may in turn damage sensitive areas to the brain.

As previously observed with video display monitors, the biological effects of RF radiation are ascertainable, particularly when resonance conditions are met. It has been suggested that the focus of studies which have showed no harmful effects, and which have concluded that wireless telephone radiation is safe, depart from the fact that, in real-life, wireless users are exposed to this radiation numerous times during the course of a day and over the course of several years. Most scientific studies have not taken into account the chronic use of cell phones and other wireless devices. As devices and other sources that emit RF radiation become increasingly prevalent in our everyday lives, so too does the likelihood of exposure by users of these devices. Indeed, in current times it may be difficult, if not nearly impossible, for users to avoid this exposure such as through use of microwaves, interaction with personal computers, listening to portable music players, or using hand-held video games, and so on.

SUMMARY

Methods and apparatuses for capturing and converting radio frequency ("RF") radiation emitted from electronic devices are disclosed. In at least certain embodiments, the method includes capturing at least a portion of the RF radiation emitted from an electronic device and converting it into electrical energy. This electric energy can be used for a number of different functional purposes such as to drive an indicator showing when the RF radiation emitted from the electronic device is being converted as well as what its relative intensity is. For example, the electrical energy captured from the electronic device can be used to drive a light-emitting diode ("LED"). In other embodiments, the electrical energy can perform additional functionality such as charging a battery of the electronic device.

The apparatus may include a cover for an electronic device. In at least certain embodiments, the cover includes an embedded circuit having an antenna adapted to capture at least a portion of the RF radiation emitted from the device, an RF conversion circuit to receive the captured RF radiation from the antenna and to convert it into electrical energy, and an indicator circuit. The electric energy can be used to drive the indicator circuit to provide users with an indication that at least some of the RF radiation emitted from the electronic device is being diverted away from a user's body and converted into electrical energy. The RF antenna can be positioned near the location where a user's body is in contact or close proximity to the electronic device.

BRIEF DESCRIPTION OF THE DRAWINGS

For a better understanding of at least certain embodiments, reference will be made to the following Detailed Description, which is to be read in conjunction with the accompanying drawings, wherein.

DETAILED DESCRIPTION

Figure 1:
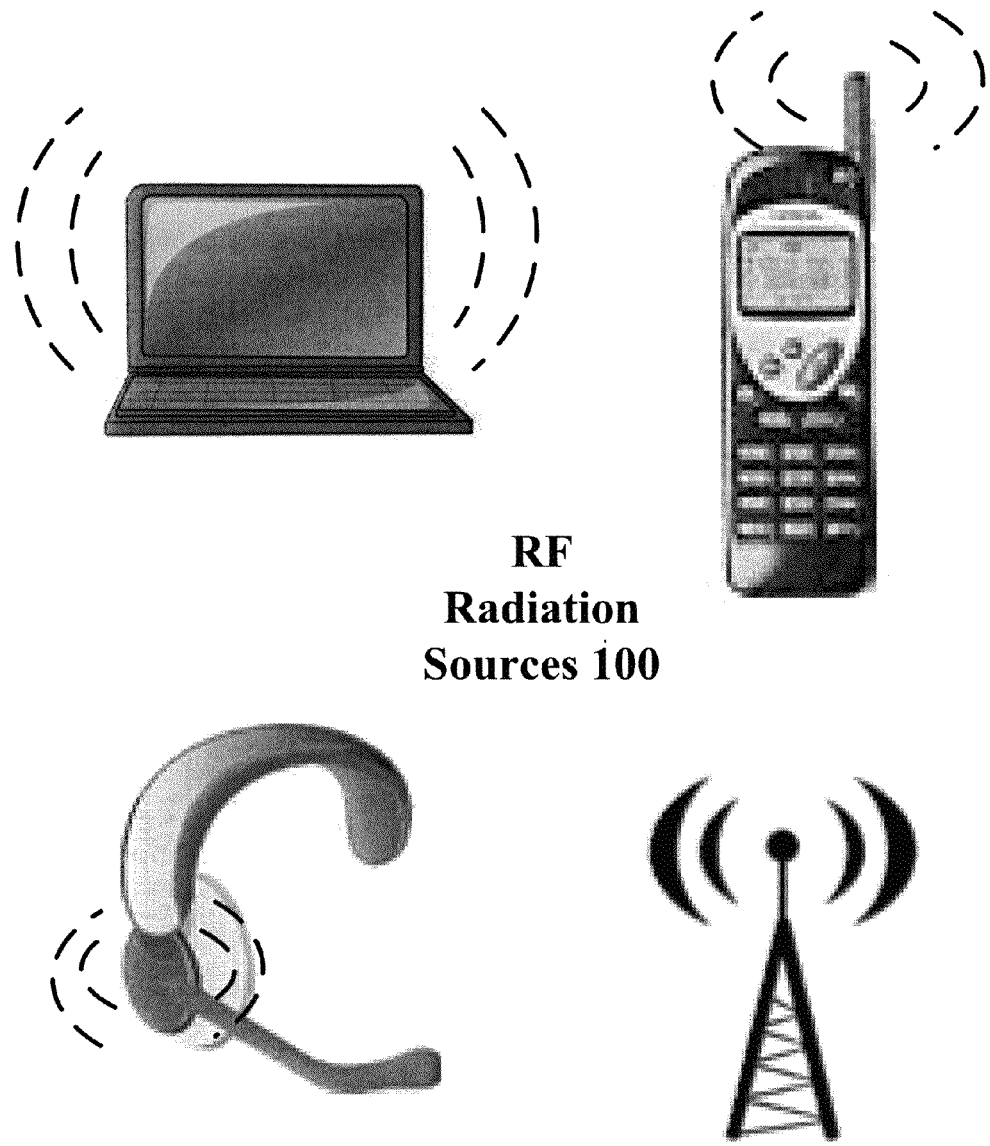
FIG. 1 depicts a number of RF radiation sources according to one illustrative embodiment.

Throughout the description, for the purposes of explanation, numerous specific details are set forth in order to provide a thorough understanding of the present invention. It will be apparent to one skilled in the art, however, that the embodiments described herein may be practiced without some of these specific details. In other instances, well-known structures and devices are shown in block diagram form to avoid obscuring underlying principles of embodiments of the invention.

A method and apparatus for capturing and converting RF radiation emitted from an electronic device are disclosed. In at least certain embodiments, the method includes capturing at least a portion of the RF radiation emitted from an electronic device and converting it into electric energy such as DC current. The DC current can then be used for a number of different functional purposes. For example, the DC current can be used to drive an indicator circuit to provide an indication when the RF radiation is being converted. The indicator circuit may include an LED that varies its brightness according to the relative power level of the RF radiation being absorbed. The electrical energy captured from the electronic device can be used to drive the LED to visually alert users during times when RF radiation is being converted and to allow users to observe the relative intensity of the captured RF radiation.

This is advantageous for several reasons. First, the LED can give a visual indication to a user showing the user when— and how much—RF radiation is being converted from their particular electronic devices. As the portion of RF radiation emitted from the users' devices increases, the LED can be configured to flash more brightly and faster, indicating in a very palpable manner to users the amount of RF radiation that is being dissipated in the circuit described herein. This allows users to visualize and hence begin to understand the amount of RF radiation emitted from their devices that they are being exposed to at various times throughout the day, both at times during use and also when idle. This enables users to understand the amount of RF exposure their devices are subjecting them to, and to further understand in a very real sense their long-term exposure to these potentially harmful levels of RF radiation. Second, having provided an indication to users about the amount of RF radiation they are experiencing in their everyday lives, the techniques described herein are also advantageous in giving users the motivation to modify their behavior to avoid or at least moderate their exposure to this radiation.

The techniques described herein are not limited to any particular LED. The LED can be implemented on a flexible or rigid substrate. In addition, the LED can be made of any inorganic or organic materials, and can be of variable brightness. Organic composites or polymers such as light-emitting polymers ("LEPs") or organic LEDs ("OLEDs") can be used. The OLEDs and LEPs can be used to create a visual indication that is not limited to a flashing LED. For example, the LED can also be a display screen that lights up during times when the RF radiation is being converted. These display screens can be used to display any number of different displays such as a particular pattern, information such as date and time of day, a banner advertisement, or other display of information; or any other text or pictures. The electrical energy can also be used to drive other types of indicator circuits to provide a palpable indication to users. The indicator circuits can include sound or vibration, or any combination of these indications. The electrical energy captured from the RF radiation can also be used to perform additional functionality in the electronic device such as charging a battery.

In one embodiment, all the electrical power necessary to drive the indicator circuit such as an LED is derived from the captured RF radiation, and in other embodiments, the electrical power may be derived from additional sources such as the electronic device's battery.

The apparatus disclosed herein may include a cover for the electronic device. For the purposes of the present description, the term "cover" is to be interpreted broadly to include a hard or soft cover for the electronic device, a skin, or coating, etc. The cover may also be built into, or otherwise be an integral part of, the electronic device itself; and accordingly can be marketed and sold as a complete package of device and cover together. The cover may also be separate from the skin or outer shell of the electronic device, or can be any combination of these. In one embodiment, the cover can be a protective cover that may be in any form such as a protective case, shielding, article of clothing, a sticker or other adhesive material, or even a clip or clamp that can be secured to an electronic device for the purposes of capturing RF radiation emitted from the electronic device; or any combination of these embodiments. The cover can be fabricated of any material such as an insulating or conductive material, or metallic material, Velcro or related material, or even a single molded piece of material of any composition.

The cover may also include built-in electrical contacts configured to interface with corresponding electrical contacts of an electronic device such that the captured RF radiation can drive the interface of the device. In such an embodiment, the device software, hardware or combination of device software and hardware can be used in combination with the embodiments described herein to provide an indication originating from within the electronic device itself. For example, the contacts on the cover can be aligned with contacts built into the electronic device such as a device interface to provide an indication from the device itself. For example, the indication can be provided on the screen or other indication mechanism of the electronic device alerting users during times when RF radiation is being captured. In addition, the amount of RF radiation over time can be calculated by the device such as through the use of device software, hardware, or combination and can be provided to users from the electronic device such as on the screen or other output mechanism of the device. The contacts of the cover can be driven by the electronic current generated by the cover during RF radiation capture.

The apparatus can include a cover having an embedded antenna adapted to capture at least a portion of the RF radiation emitted from the device, a conversion circuit adapted to receive the captured RF radiation from the antenna and to convert it into electric current, and an indicator circuit to provide an indication to users during times when RF radiation is being converted. The indicator circuit can also provide an indication of the relative intensity of the RF radiation being absorbed by the described embodiments. As used herein, the term "antenna" refers to any electrical device or material that sends and/or receives electromagnetic waves. For instance, an antenna can be an RF antenna or other device or material of equivalent functionality. The antenna can be positioned at a location near where a user's body would come into contact or proximity to the electronic device. By capturing a portion of the RF radiation emitted from the electronic device, users can be protected from that portion of RF radiation which would otherwise be channeled into their bodies.

FIG. 1 depicts a number of RF radiation sources 100 according to one illustrative embodiment. There are many sources of RF radiation that people are exposed to in their everyday lives including wireless phones and headsets, computers, televisions, wireless routers and gateways, cable modems, microwaves, hair dryers, etc. One of the advantages of the techniques described herein is that users can be protected from the potential harmful effects of long-term exposure to the RF radiation emitted from electronic devices, particularly wireless phones and headsets, which are often held in close proximity to a user's body. A portion of the RF radiation emitted from users' electronic devices can be converted and dissipated in the indicator circuit of the apparatus described herein. As such, these techniques can be used to avoid or mitigate the long-term effects of RF radiation exposure by allowing users to place a cover on his or her electronic devices that functions to convert some of the RF radiation into electrical energy. This electrical energy can be used to drive an indicator or to perform other useful work for users, or both. For example, the redirected electrical energy can be also used to drive various electronic functionality of the electronic device such as charging its battery.

Figure 2A:
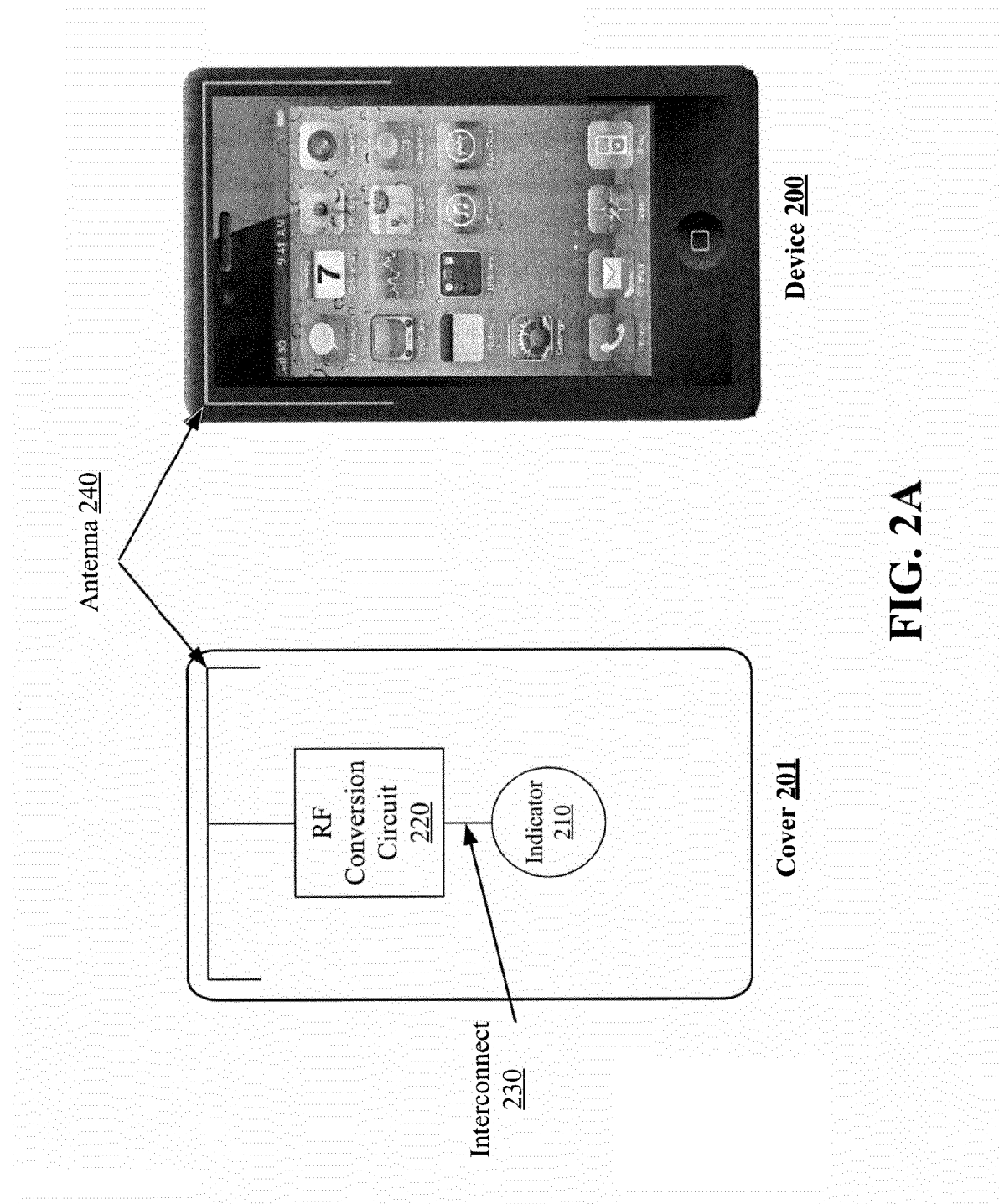
FIG. 2A depicts an apparatus including a cover for converting RF radiation in an electronic device according to one illustrative embodiment.

FIG. 2A depicts an apparatus including a cover for converting RF radiation in an electronic device according to one embodiment. In the illustrated embodiment, cover 201 is used to convert RF radiation emitted from electronic device 200. Cover 201 includes an RF antenna 240 coupled with an RF conversion circuit 220. The RF conversion circuit 220 is further coupled with an indicator circuit 210 via an interconnect 230. Antenna 240 is adapted to capture at least a portion of the RF radiation emitted from the electronic device 200. The RF radiation captured by antenna 240 is then output to RF conversion circuit 220 where it is converted into DC electric current supplied to indicator circuit 210. As described above, indicator circuit 210 can include any visual, auditory, or other palpable indicator to alert users during times when the RF radiation emitted from their electronic device 200 is being captured and converted into electrical energy. Antenna 240 may be either a passive antenna, or a partially passive and partially active antenna. But a passive antenna is preferred as it avoids interference with the electronic device. Antenna 240 may be a dipole antenna, a meandering antenna, a monopole antenna, or any other directional or omni-directional antenna that can capture RF radiation.

In addition, antenna 240 may include multiple antennas such as would be used in an embodiment where it is desirable to capture multiple frequencies of RF radiation from an electronic device for versatility or compatibility purposes. The multiple antenna embodiment may be useful for capturing different frequencies known to be used by different manufacturers, or the same manufacturer. Table 1 lists a number of frequencies used by various current manufacturers of wireless telephones and cellular carriers in the U.S.:

| Carrier | Frequencies | Technology |
| --- | --- | --- |
| AT&T | 850 MHz | GSM/GPRS |
|  | 1900 MHz | EDGE |
|  | 1.7/2.1 GHz | UMTS/HSPA |
|  |  | LTE |
| Metro PCS | 1900 MHz | CDMA 2000 1X Ev-Do |
|  | 1.7/2.1 GHz | LTE |
| Nextel | See Sprint | iDEN |
| Qualcomm | 700 MHz | MediaFLO |
| Sprint | 1900 MHz | CDMA 2000 1X Ev-Do |
|  |  | CDMA |
| T-Mobile | 1900 MHz | GSM/GPRS |
|  | 1.7/2.1 GHz | EDGE |
|  |  | UMTS |
|  |  | LTE |
| Verizon | 850 MHz | CDMA |
|  | 1900 MHz | CDMA 2000 1X Ev-Do |
|  | 700 MHz | LTE |

Figure 2B:
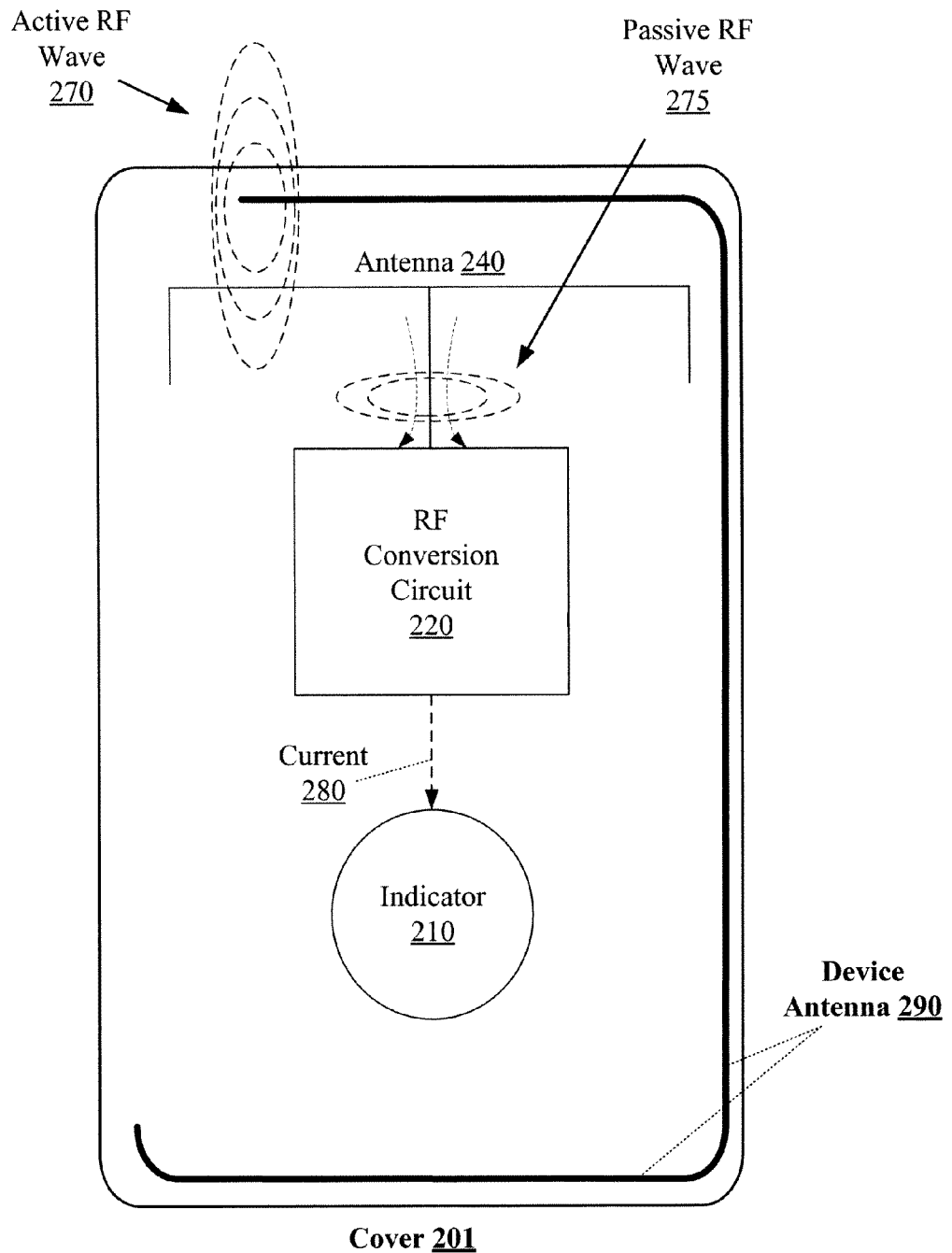
FIG. 2B depicts an apparatus including a cover for converting RF radiation in an electronic device according to one illustrative embodiment.

The operation of the preferred embodiment of the apparatus will now be described with reference to FIG. 2B. In the illustrated embodiment, the antenna 290 of device 200 is shown superimposed on top of cover 201. During operation of the electronic device, antenna 290 emits an active RF waveform 270. This can be during a phone call, for example, or at another active period of the electronic device, although enough RF radiation may be emitted even during passive periods of the electronic device. In addition, RF radiation may also come from other external sources such as a nearby cell tower (as depicted in FIG. 1). For illustrative purposes, we will only refer to RF radiation that is generated from the electronic device. When the active RF wave 270 is generated by device antenna 290, part of the wave is captured by antenna 240 of the cover 201 through electromagnetic induction. This captured part of the active RF wave is shown as passive RF wave 275 in the diagram. As described above, antenna 240 need not be limited to a passive antenna, but in the preferred embodiment, a passive antenna is used both for better cost efficiency and also so that it does not interfere with the active device antenna 290 of the device. Also as discussed above, antenna 240 can be a single or multiple antennas. In this embodiment, once passive RF wave 275 is captured by antenna 240, it is driven through to RF conversion circuit 220 where it gets converted to an electric current 280, and then driven out to indicator circuit 210.

Figure 3A:
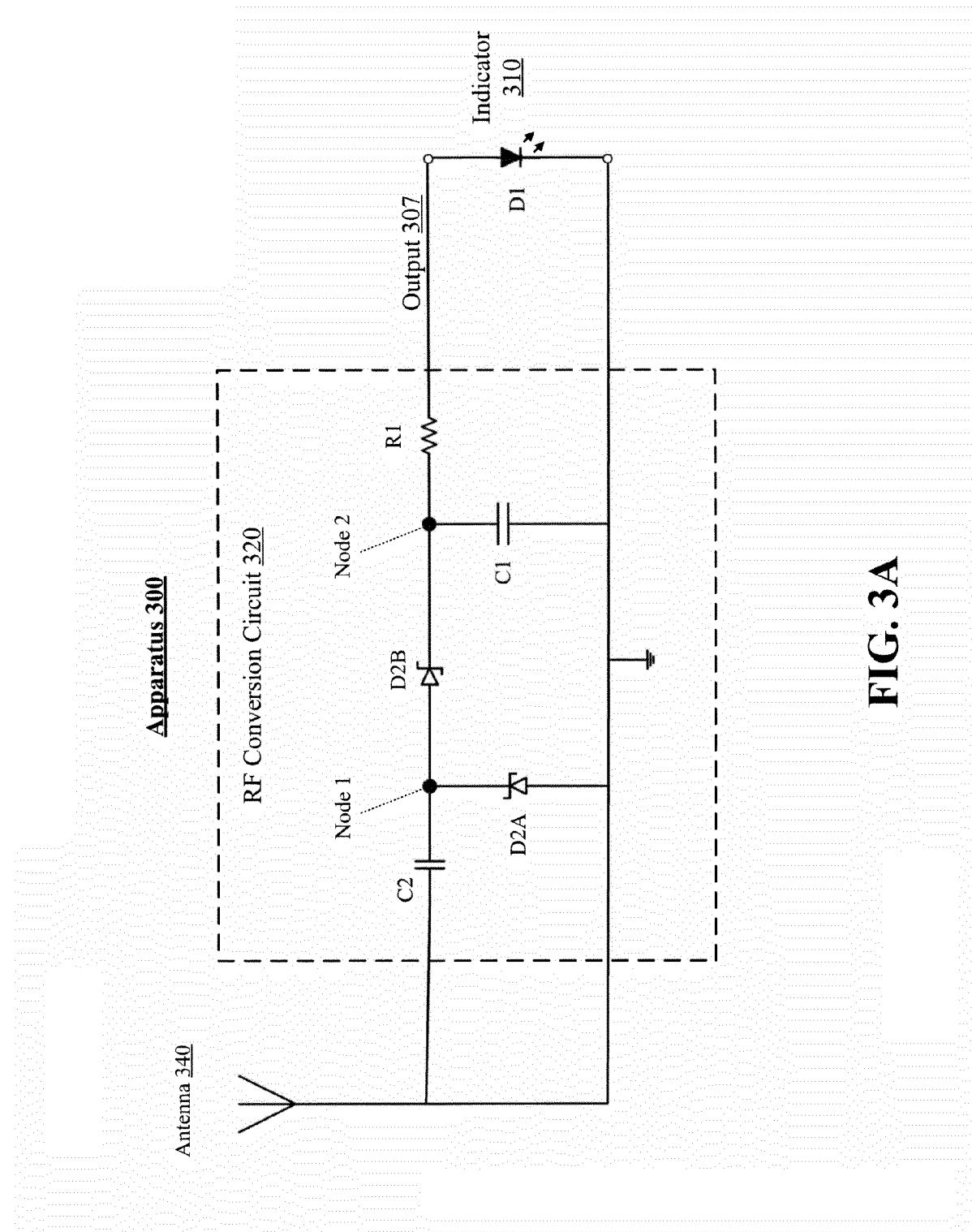
FIG. 3A depicts an apparatus including a circuit for converting RF radiation in an electronic device according to one illustrative embodiment.

FIG. 3A depicts an example embodiment of an apparatus including a circuit for converting RF radiation in an electronic device. Apparatus 300 includes antenna 340, RF conversion circuit 320, and an indicator circuit 310. As discussed above, the antenna can be any antenna, material, or device that captures RF radiation. In the illustrated embodiment, RF conversion circuit 320 includes a clamp circuit followed by a rectifier circuit. The clamp circuit includes diode D2A in parallel with capacitor C2. The output of the clamp circuit is Node 1. The rectifier circuit includes diode D2B and capacitor C1. The output of the rectifier circuit is Node 2. Resistor R1 is optional and can be configured by the circuit designer to adjust the flow of current at the output 307 from RF conversion circuit 320 to the indicator circuit 310. In the illustrated diagram, indicator 310 includes a LED D1.

Figure 3B:
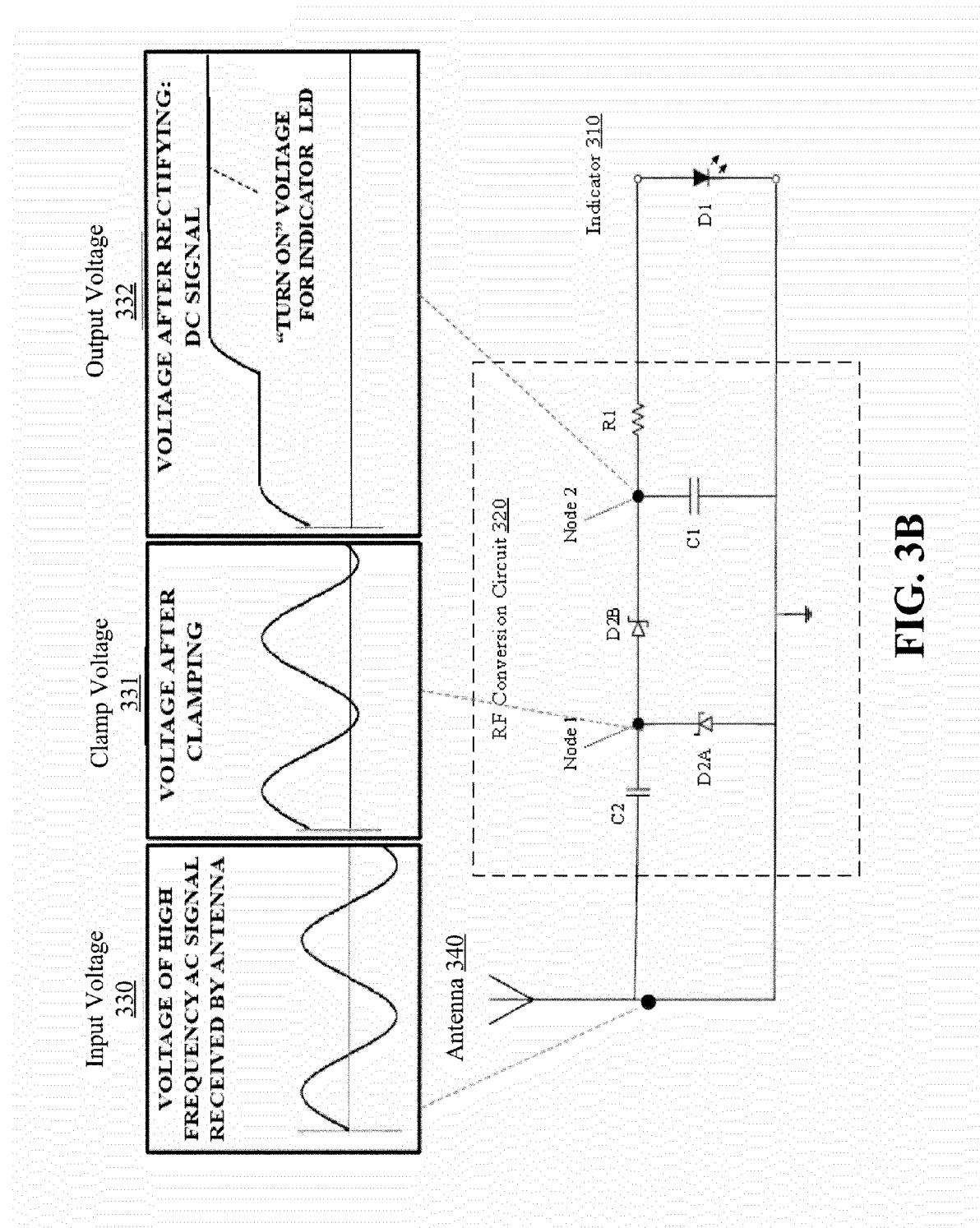
FIG. 3B depicts example voltage output waveforms according to one illustrative embodiment.

The operation of the apparatus 300 will now be described with reference to FIG. 3B, which depicts example voltage output waveforms output according to one illustrative embodiment. As shown in the illustration, the input voltage 330 of the RF radiation received by antenna 340 is a normal sinusoidal wave signal that oscillates equally above and below zero volts (i.e., ground potential). The voltage waveform 331 at the output of the clamping circuit (Node 1) is also a sinusoidal wave signal, but it has been shifted up by some positive value according to the voltage present across capacitor C2 and limited to the difference between ground and the forward bias voltage of the diode. The voltage waveform 332 after the rectifier circuit (Node 2) approximates a DC signal held in a steady-state by capacitor C1 as shown in the diagram. According to this embodiment therefore an input sinusoidal signal associated with the RF radiation received at antenna 340 is converted to an output DC signal at Node 2 that is used to drive current through R1 into the indicator circuit 310.

Figure 4:
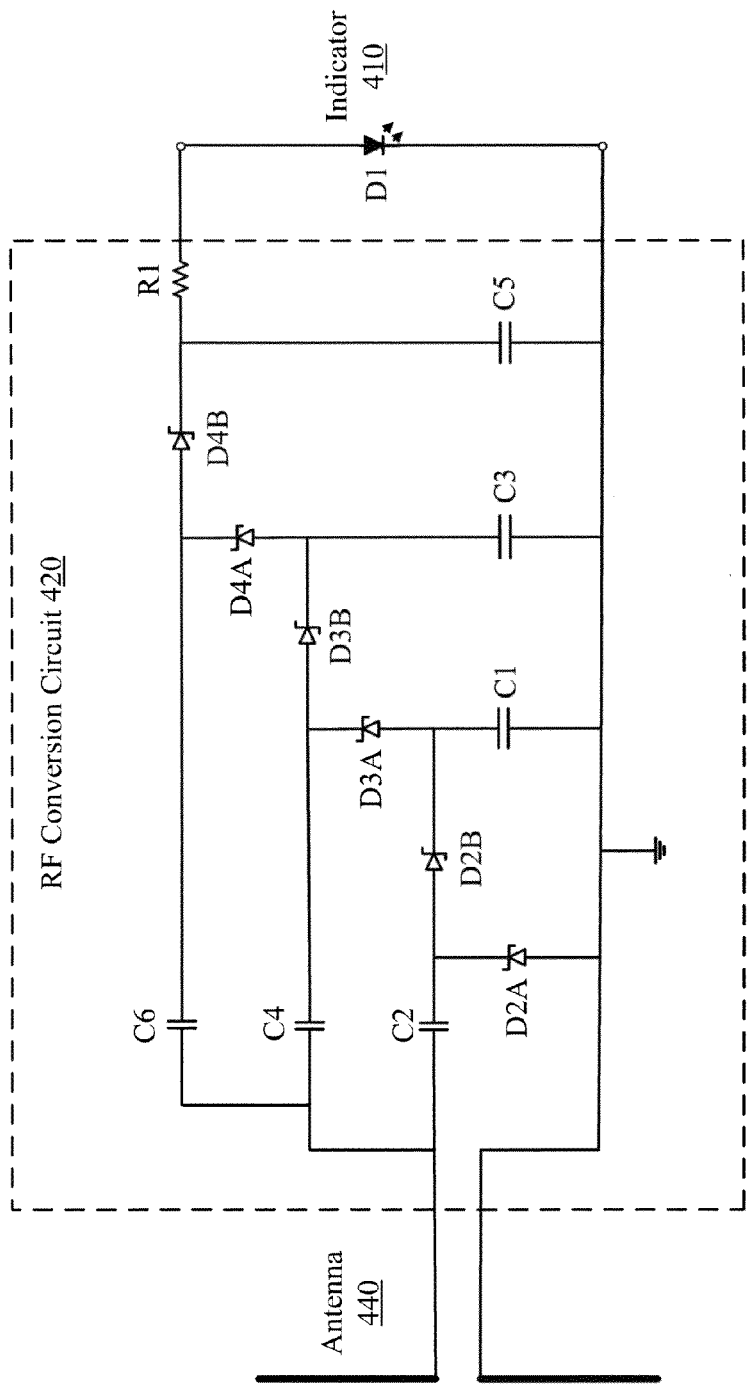
FIG. 4 depicts an example of a preferred embodiment of an apparatus including a circuit for converting RF radiation in an electronic device.

FIG. 4 depicts an example of a preferred embodiment of an apparatus including a circuit for converting RF radiation in an electronic device. In this preferred embodiment, antenna 440 is a dipole antenna. RF conversion circuit includes three stages of clamping circuits followed by a rectifier circuit as shown in FIG. 3A. Apparatus 400 shows a first stage (D2A, C2, D2B, C1), a second stage (D3A, C4, D3B, C3), and a third stage (D4A, C6, D4B, C5). Embodiments however are not so limited as more or fewer stages can be used depending on several design choices such as the size of the circuit implementation, the size of the output resistor R1, the size and desired brightness of the LED D1, and the amount of DC current that drives the LED. In addition, other circuits known in the art to convert RF signals into an electric current can also be used. The techniques described herein are not limited to any particular configuration of the RF conversion circuit. In addition, the battery may be rechargeable and may be charged by the techniques described herein in addition to the normal battery charging mechanisms provided on the device itself such as conventionally through a wall plug or AC adapter. Solar panels, or any other energy harvesting methods may also be incorporated into the cover apparatus to provide additional battery charging, or may charge the battery independently of the battery charging mechanism discussed above.

Figure 5:
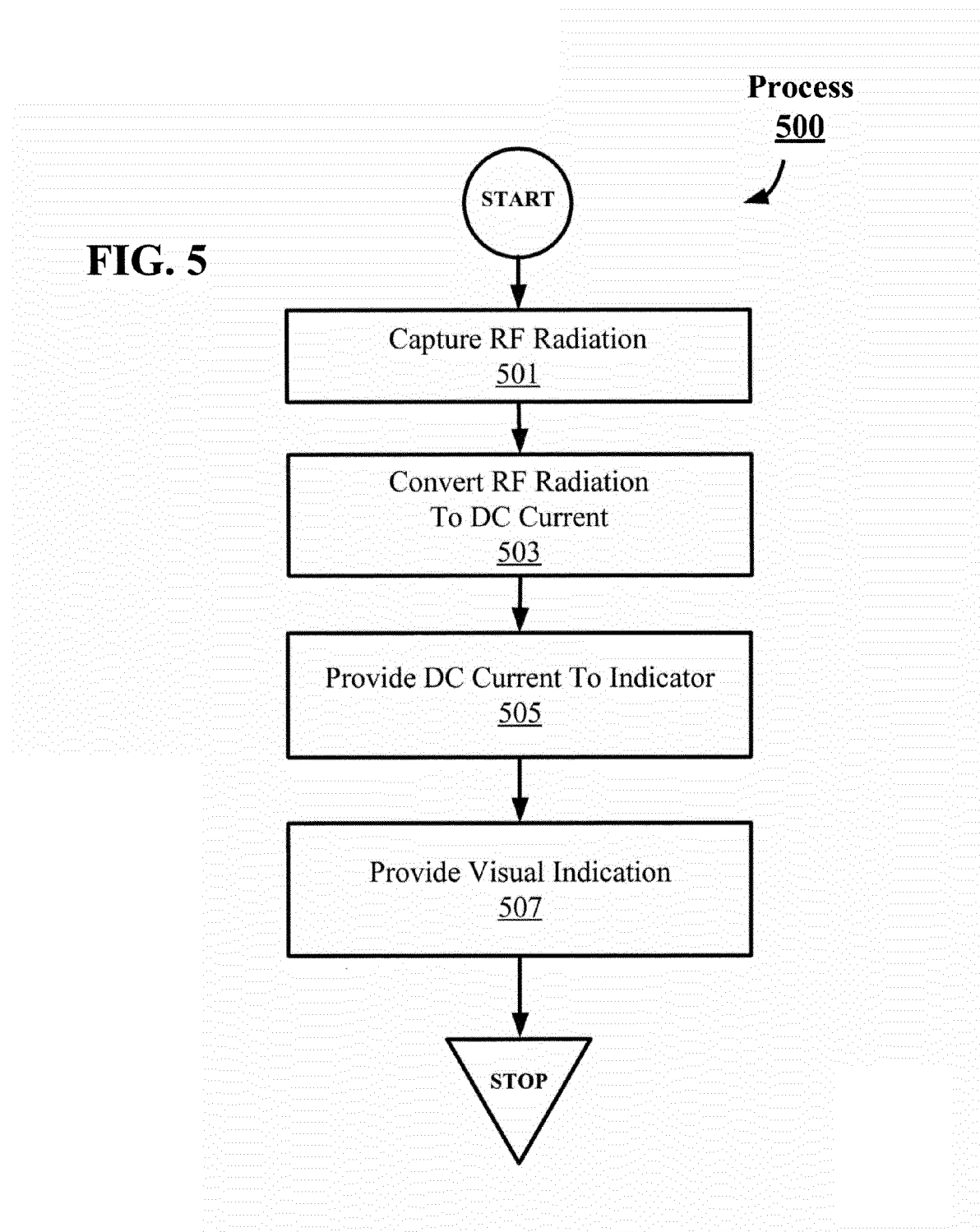
FIG. 5 depicts a process for converting RF radiation in an electronic device according to one illustrative embodiment.

FIG. 5 depicts a process for converting RF radiation in an electronic device according to one illustrative embodiment. Process 500 begins by capturing at least a portion of the RF radiation emitted from a particular electronic device (operation 501). As described above, this is done using an antenna or other equivalent mechanism to divert part of the RF radiation to an antenna through electromagnetic induction. The captured RF radiation is then converted to DC current (operation 503) and provided to an indicator circuit (operation 505). The indicator circuit provides the visual indication at operation 507. In one embodiment, the visual indication provides both an indication as to when the absorption of RF radiation occurs and its relative intensity. This completes process 500 according to one embodiment. As discussed above, embodiments may include other types of indications and are not limited to visual indications.

Figure 6:
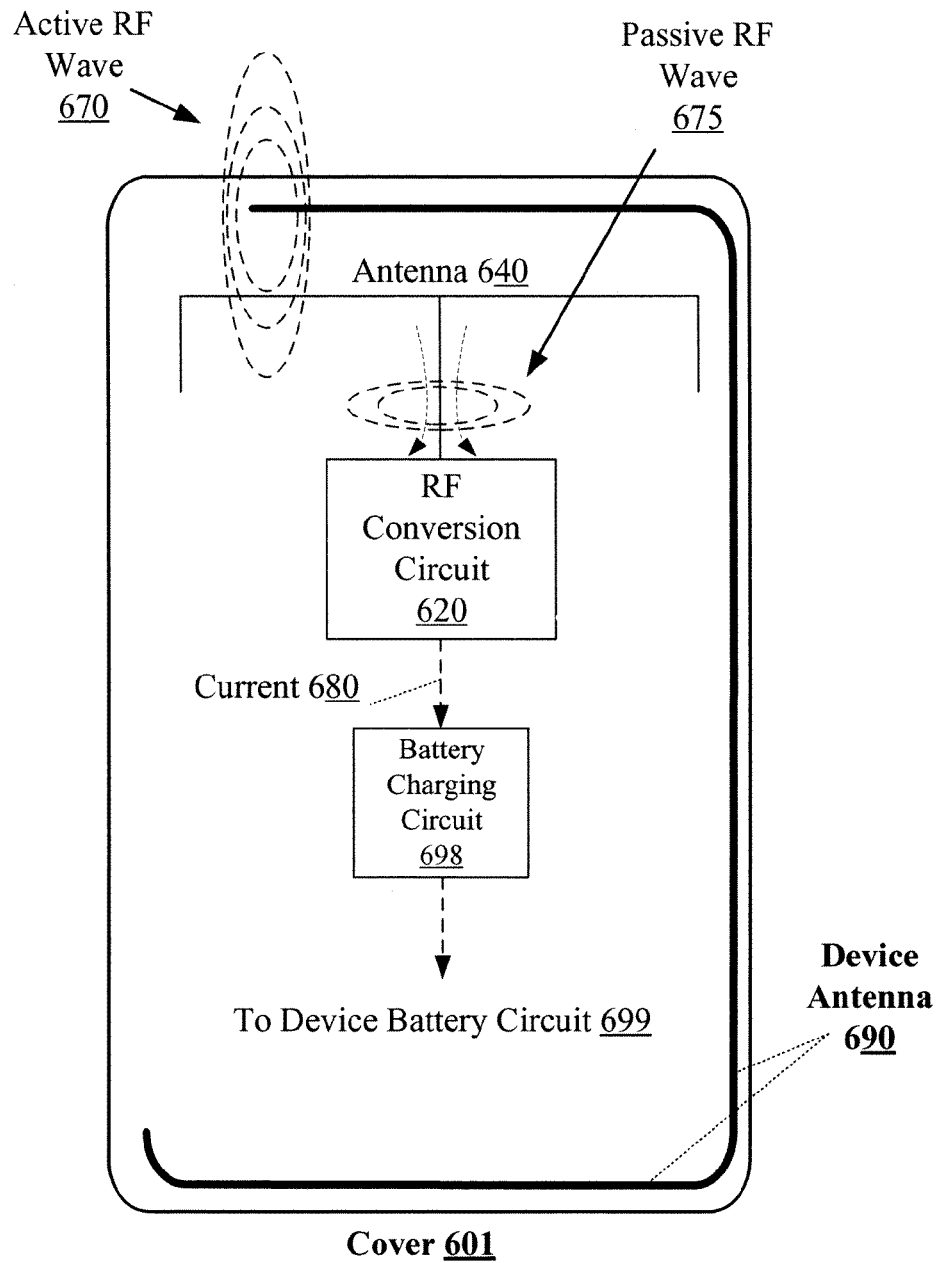
FIG. 6 depicts an apparatus including a circuit for converting RF radiation in an electronic device according to one illustrative embodiment.

The electric energy generated from the captured RF radiation can also be used to provide useful work. For example, the DC current can be used to charge a battery of the electronic device as shown in FIG. 6, which depicts an example apparatus including a circuit for converting RF radiation in an electronic device. In the illustrated embodiment, current 680 that is driven from the output of RF conversion circuit 620 is used to drive a battery charging circuit 698 that is output to a device battery circuit 699 of the electronic device (not shown) to charge the battery of the electronic device. Therefore the captured RF radiation 675 can be used to charge the battery of the electronic device. This can be accomplished by itself as shown in FIG. 6, or in combination with driving the LED.

Figure 7:
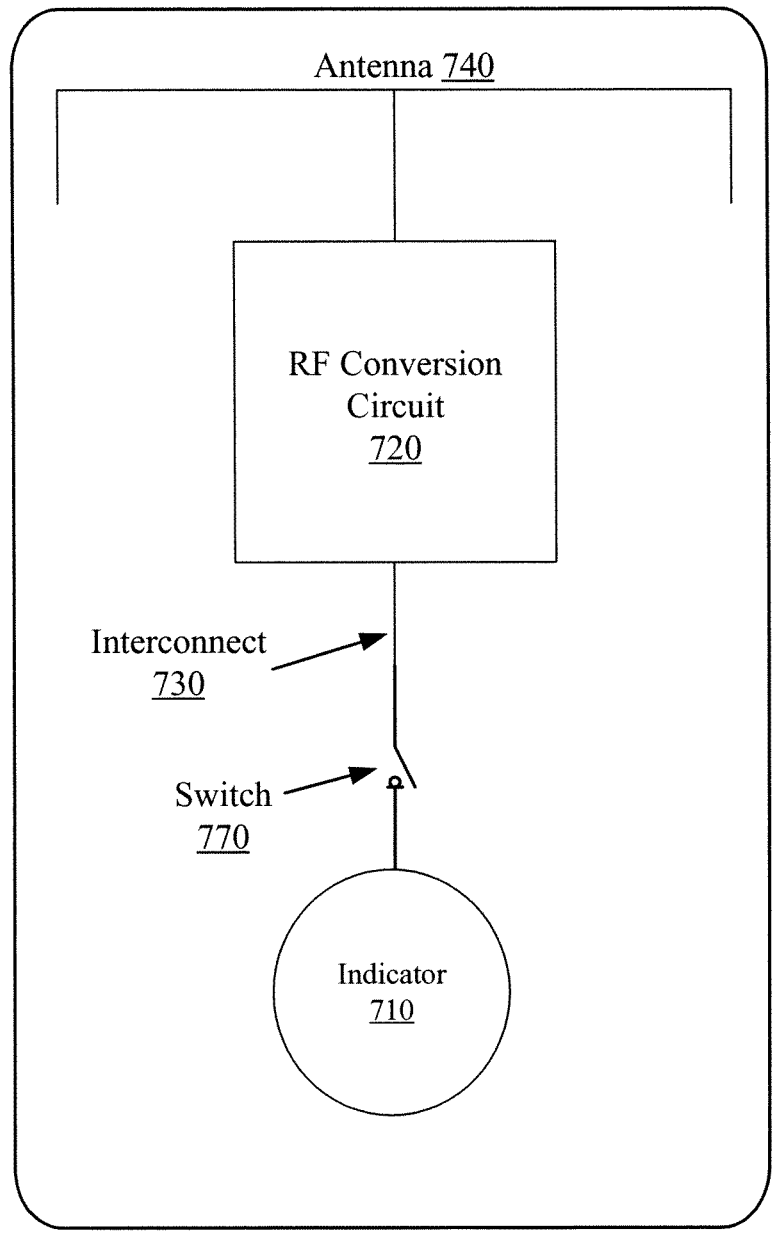
FIG. 7 depicts an apparatus including a circuit for converting RF radiation in an electronic device according to one illustrative embodiment.

In addition, a switch can be used to allow users to turn off the indication circuit during times when it is undesired, such as during a theater performance. FIG. 7 depicts an example apparatus including a cover having a switch 770 that is adapted to selectively activate and deactivate the indicator 710, although other embodiments are possible. In this embodiment, the switch 770 is located on the interconnect 730 between RF conversion circuit 720 and indicator circuit 710. When the switch 770 is placed in the open position as shown in the diagram, interconnect 730 becomes an open circuit and no current flows through to drive the indicator 710. When this happens, the indicator 710 will be shut off And during times when the switch 770 is placed in the closed position (not shown), interconnect 730 becomes a closed circuit, and current can flow through to drive the indicator 710. When this happens, the indicator 710 will be turned on. This functionality provides users with a selection mechanism to turn on and off the indicator 710 as desired. Such a switch 770 can be actuated by any user input device in the field of art. This switch 770 can also be configured to interface with the electronic device such that it is actuated whenever a user switches their electronic device to silent mode, for example.

Various techniques described herein may also be used in combination with other RF radiation abatement techniques. For example, RF radiation absorption materials such as paramagnetic materials or other RF absorption materials or fabrics may be used to further limit users' exposure to RF radiation emitted from their electronic devices. Throughout the foregoing description, and for the purposes of explanation, numerous specific details are set forth in order to provide a thorough understanding of the described techniques. It will be apparent, however, to one skilled in the art that these techniques may be practiced without some of these specific details. Although various embodiments which incorporate these teachings have been shown and described in detail, those skilled in the art could readily devise many other varied embodiments or mechanisms to incorporate these techniques.

Also, embodiments may include various operations as set forth above, fewer operations, or more operations; or operations in an order. Accordingly, the scope and spirit of the invention should be judged in terms of the claims which follow as well as the legal equivalents thereof.

What is claimed is:

1. A method comprising:
capturing at least a portion of radio frequency ("RF") radiation emitted from an electronic device using a first antenna separate from a second antenna of the electronic device;
diverting the captured RF radiation away from a user and converting it into electric current using a conversion circuit so that the user is protected from exposure to a portion of the RF radiation emitted from the electronic device;
feeding the electric current into an indicator circuit, wherein the indicator circuit provides an indication to the user when the RF radiation emitted from the electronic device is being diverted; and
activating and deactivating the indicator circuit based on user-controlled input.

2. The method of claim 1, wherein the first antenna is a passive antenna configured to couple with the RF radiation emitted from the second antenna of the electronic device through electromagnetic induction.

3. The method of claim 1, wherein the first antenna is adapted to be positioned proximate to a location where a user interacts with the electronic device.

4. The method of claim 1, wherein the indication includes a visual indication showing when diversion of the RF radiation occurs and its intensity.

5. The method of claim 4, wherein the visual indication includes activating a light-emitting diode ("LED").

6. The method of claim 4, wherein the visual indication is displayed from the electronic device.

7. The method of claim 1, further comprising reducing at least some of the potentially harmful effects of RF radiation from long-term exposure.

8. The method of claim 1, further comprising charging a battery of the electronic device, wherein the charging of the electronic device uses the electric current from the conversion circuit.

9. The method of claim 8, wherein the charging of the battery uses energy harvested from solar panels.

10. The method of claim 1, wherein the activating and deactivating of the indicator circuit is controlled by a selection mechanism, and wherein the selection mechanism is actuated when the user switches the electronic device to a silent mode.

11. A cover for an electronic device comprising:
a first antenna embedded into the cover separate from a second antenna of the electronic device, the first antenna configured to capture at least a portion of radio frequency ("RF") radiation emitted from the electronic device;
a conversion circuit electrically coupled with the first antenna, the conversion circuit configured to divert the captured RF radiation away from a user and convert it into electric current so that the user is protected from exposure to a portion of the RF radiation emitted from the electronic device;

an indicator circuit configured to receive the electric current from the conversion circuit and to provide an indication to the user when the RF radiation emitted from the electronic device is being diverted; and a selection mechanism to activate and deactivate the indicator circuit based on user-controlled input.

12. The cover of claim 11, wherein the first antenna is a passive antenna configured to couple with the RF radiation emitted from the second antenna of the electronic device.

13. The cover of claim 11, wherein the first antenna is positioned proximate to a location where a user interacts with the electronic device.

14. The cover of claim 11, wherein the user is protected from that portion of the RF radiation emitted from the electronic device that is dissipated in the indicator circuit.

15. The cover of claim 11, wherein the indicator circuit comprises a light-emitting diode ("LED") adapted to provide the visual indication when diversion of the RF radiation occurs and its relative intensity.

16. The cover of claim 15, wherein the visual indication is displayed from the electronic device.

17. The cover of claim 11, wherein the protection provided by the cover is adapted to reduce at least some of the potentially harmful effects of RF radiation from long-term exposure.

18. The cover of claim 11, wherein the conversion circuit comprises a clamp circuit followed by a rectifier circuit.

19. The cover of claim 18, wherein the conversion circuit includes multiple stages of a clamp circuit followed by a rectifier circuit.

20. The cover of claim 11, further comprising a battery charging circuit configured to receive the electric current from the conversion circuit and to charge a battery of the electronic device.

21. The cover of claim 20, wherein the battery of the electronic device is also charged by energy harvested from solar panels.

22. The cover of claim 11, wherein all power necessary to drive the indicator circuit comes from the captured RF radiation.

23. The cover of claim 11, wherein the cover is either part of the electronic device or is a separate apparatus adapted to be fitted or attached to the electronic device.

24. The cover of claim 11, wherein the selection mechanism is configured to interface with the electronic device and to actuate when the user switches the electronic device to a silent mode.

25. A case for an electronic device comprising:
an RF antenna built into the case separate from an antenna of the electronic device, the RF antenna adapted to capture a portion of radio frequency ("RF") radiation emitted from the electronic device;

a conversion circuit configured to divert the captured RF radiation away from a user and convert it into electric current so that the user is protected from exposure to a portion of the RF radiation emitted from the electronic device; and an indicator circuit electrically coupled with the conversion circuit, wherein indicator circuit is configured to provide an indication to the user when the RF radiation emitted from the electronic device is being diverted; and a selection mechanism to activate and deactivate the indicator circuit based on user-controlled input.

26. The case of claim 25, wherein the RF antenna is positioned proximate to a location where a user interacts with the electronic device.

27. The case of claim 25, wherein all power necessary to drive the indicator circuit comes from the captured RF radiation.

28. The case of claim 25, wherein the case is either part of the electronic device or is a separate apparatus adapted to be fitted or attached to the electronic device.

29. The case of claim 25, wherein the selection mechanism is configured to interface with the electronic device and to actuate when the user switches the electronic device to a silent mode.

* * * * *